April 22, 1952     E. C. SEWARD     2,593,494
FREIGHT HANDLING EQUIPMENT
Filed June 1, 1949     6 Sheets-Sheet 1

Inventor
Edgar C. Seward
ATTORNEYS

April 22, 1952     E. C. SEWARD     2,593,494

FREIGHT HANDLING EQUIPMENT

Filed June 1, 1949     6 Sheets-Sheet 5

Inventor
Edgar C. Seward

By *[signatures]*

ATTORNEYS

Patented Apr. 22, 1952

2,593,494

UNITED STATES PATENT OFFICE 2,593,494

FREIGHT HANDLING EQUIPMENT

Edgar C. Seward, Arlington, Va.

Application June 1, 1949, Serial No. 96,609

7 Claims. (Cl. 214—14)

(Granted under the act of March 3, 1883, as amended April 30, 1928; 370 O. G. 757)

The invention described herein may be manufactured and used by or for the Government for governmental purposes, without payment to me of any royalty thereon.

The present invention provides certain improvements in material-handling equipment designed to expedite the handling of cargo, for example, the stowing and unloading of cargo in the holds of ships or in freight cars, and to expedite the clearing of cargo from piers, wharves and docks.

The invention has for one of its objects the provision of simplified material-handling equipment which performs the functions of a traveling crane of a gantry type, or a rotating crane, but which is characterized by a highly simplified construction and ease of installation and operation.

A further object of the invention is to provide hoisting equipment which is capable of both longitudinal and transverse movements relative to cargo-carrying means and relative to a multiple-level wharf or dock shed whereby a very simple and rapid handling of the various articles of a cargo may be effected, and at any selected level of a multiple-level storage shed.

Further objects and advantages of the invention will become apparent as the description proceeds, and the features of novelty will be pointed out in particularity in the appended claims.

Considerable study has been given to the need of fast, modern cargo and passenger ships both from the standpoint of a branch of national defense during emergencies and as an adjunct to national peacetime economy for coastwise and intercoastal trade and the export and import of raw materials and manufactured products. Modern ships with double-rigged and equal-cubic hatches are found to be of definite advantage over single-rigged unequal-cubic hatched ships, such as ships of the so-called "Liberty" type, which frequently occasion delays and require much overtime in stowing and unloading cargo.

However, the cargo ship is of no value unless freight can be loaded thereon and discharged therefrom, since its prime purpose is to carry cargo. This brings up the problem of loading and discharging these ships as expeditiously as possible since the sea time of fast, expensively operated ships has been shortened by their increased speed. Therefore, considerable attention is required to reducing the port time necessary for loading and unloading cargo; and modern terminals and piers which provide quick dispatch are as much a necessity as modern fast cargo ships, they not only provide a quick vessel turnover, but they conserve manpower, reduce handling costs and the number of ships required to move a certain amount of cargo.

Nevertheless, the desired rapid movement of general cargo across the pier is seldom achieved, although there are many times when the operator would appreciate a fast clearing terminal which would permit the movement of a large volume of cargo in a limited time. To achieve the rapid movement of such a volume requires ample trackage, storage space, and modern dock gear and equipment, as well as adequate labor and minimum of rehandling within as short a transfer distance as possible. With the increased cost of ship operation, of which port costs represent an ever-increasing proportion, quick dispatch requires modern fast clearing terminals, even though terminal and pier construction costs have also increased. At present costs, a day saved in loading or discharging a ship results in a savings up to several thousand dollars; and a local shipper who trucks to a pier can reduce his costs substantially by being able to load or unload his truck quickly instead of waiting hours, as is the custom in many ports with inadequate truck facilities. Demurrage is another costly factor that is included in the overall costs and warrants additional expenditures to provide a fast clearing port terminal and pier. In times of emergency, speed becomes of great importance, obviously, and in recent times the loss of ship days has been considerable, due to inadequate port facilities and antiquated piers that are very prevalent in large seaports.

The loading of a ship involves the stowage factor of the cargo and ship, the gang rate per hour of the various commodities to be loaded, stability and trim of the vessel for seaworthiness, loading and separating the cargo in each hatch to provide stability and trim as well as the sequence in which the cargo must be unloaded if the ship makes more than one port of call and the same space must be reloaded with other cargo booked from that port. This loading and unloading of the cargo may occur several times on a voyage and the vessel must be seaworthy at all times.

The foregoing considerations indicate some of the many problems that must be dealt with in correctly loading a ship and show the need of placing cargo on the pier in proper order and as near as possible to the hatch into which it is to be loaded. It would be an ideal operation if the cargo for the total capacity of the hatch could be assembled within reach of the hook, but on ships with large hatches this is impossible on any existing pier. However, the next best operation is to bring as much cargo as possible to this point, eliminating as much rehandling and transfer distance as possible.

In view of the foregoing requirements, and in recognition of the needs of modern piers, the present invention was developed, an illustrative embodiment of which is shown in the accompanying drawings, in which.

Referring more particularly to the drawings, reference character A indicates a multiple level warehouse or shed on a wharf or dock provided with an apron A' having thereon spaced parallel railroad tracks B on which are shown the freight cars C. The dock apron A' is provided with vertically movable platforms D which are actuated hydraulically, electrically, or the like, so as to lift from a low position, level with the deck of the dock apron A', to a high position which is level with the floor of the cars S. These platforms enable ready working of two cars standing side by side on the parallel tracks, by minimizing the amount of lifting of freight loads from and into the cars. The warehouse or dock shed A is composed of spaced vertical pillars 11 and horizontal floor levels 13, 15, the resulting openings at each floor level between the pillars 11 being closable by overhead doors, and closure means which will be described in greater detail hereinafter. The drawings (Figs. 2, 3 and 4) also indicate a ship E tied up at the dockside, there being indicated the manner of handling cargo by the equipment of the present invention between the ship and cars and between the ship and warehouse shed.

The invention includes the above-outlined features of dock construction, and also readily portable material-handling equipment which is designed to cooperate with the improved features of dock design, and which is disposed for quick clearance of cargo from the dock and ship for minimizing congestion of freight on the dock and demurrage on the ship being engaged in cargo transfer.

The invention also comprises the following features: The warehouse or shed A has constructed upon the top thereof a plurality of structural frames H, spaced apart a suitable distance, along the top of the warehouse shed A. The space between successive frames should not be sufficiently great to cause sag or distortion of any parts of the equipment under the weight of the loads being handled. Each of the frames H comprises a vertical beam 10, a horizontal outrigger beam 12 carried by the beam 10, and projecting outwardly from the front vertical plane of the shed A over the apron A' of the dock, and bracing beams 14 and 16, which support and reinforce the outrigger beams 12, the bracing beams being welded or otherwise secured rigidly to the vertical beams 10 and to the outrigger beams 12. The beams of each of the frames are structural shapes for imparting maximum strength to the structures. Thus, the beams of the frames H may be I-beams, and each frame is mounted on the warehouse shed A for maximum strength and rigidity.

The horizontal outrigger beams 12 of successive frames H form mountings for suitably spaced parallel I-beams 18 and 20 that extend longitudinally along the length of the shed A. These parallel I-beams form tracks for pulley carriages 22 which are provided with horizontal wheels 24 that engage the lower web of each I-beam, and vertical rollers 26 which engage the edges of each of the said beams. A lower plate 28 spans the vertical side plates 30, and from this plate an eye 32 is mounted, in which is mounted shackle 33 carrying the pulley 34. Each of the carriages is actuated by a cable 36 which passes around a pulley sheave 38 mounted on one of the horizontal beams 12 and around a winch drum 40 mounted on another of the horizontal beams 12. The ends 42, 44 of each cable 36 are attached to the ends of the carriages 22, and a motor 41 is provided for actuating each of the winch drums 40 independently of the other, thereby pulling the carriages 22 independently in either direction.

The inner carriage 22 is mounted on the inner track 18 and carries the pulley 34. A hoisting cable 43 which makes an inboard fall passes over this pulley 34, this cable being attached at one end to a winch 45 that is mounted on a platform 46 mounted and secured on one of the floor levels of the shed A. The platform 46 is held in place by end brackets 48, 50 that are secured to the platform and which have corresponding holes therein for receiving a bar 52 which embraces a structural vertical pillar 11 of the shed A. The end bracket 50 carries a pulley sheave 56 under which the cable 43 passes and serves as an antifriction bearing for the cable as the direction of the cable is changed for winding on the winch 45.

Pulley 35 suspended from the outboard track 20 receives an outer hoisting cable 54 which passes over this pulley and around a second winch 56', which also is mounted on the platform 46, by way of pulley 58, that is mounted on the end bracket 48 of platform 46. The winch 45 is driven by a motor 60 and winch 56 is driven by a motor 62. Motors 60 and 62 are mounted on a raised portion 64 of the platform 46, the platform 46 being retained against forward and lateral movements by the provision of a cut-out portion 63 which cooperates with the bar 52 to retain the platform 46 in secured position. The free ends of the cables 43 and 54 are provided with eyes 66 and 68 in which are secured shackles 70, 72, that are retained by threaded bolts 74, 75, which pass through the respective eyes 66, 68. In these shackles there is mounted a ring 76 which receives a hook 78 that is adapted to engage into an eye 80 of a cargo-carrying sling 82 which includes a platform 84.

The I-beam 18 forms an inboard trolley track, and the I-beam 20 forms an outboard trolley track. Since the platform D is positioned between the tracks B so that two cars side by side can be worked simultaneously, the outboard track 20 should be mounted on the outrigger beams 12 directly over the center line between the tracks so that the sling 82 can be lifted vertically by operation of the outboard cable fall 54 so as to enable the sling to be manipulated clear of the cars C. The motors 60 and 62 operate their winches 45 and 56 entirely independently, and although these motors and winches are shown as being mounted on the same platform, this is a matter of convenience, as actually the respective motors and winches can be placed on different levels on the pier shed and also on different places on the same level. The platform 46 is itself portable, as the holding bar 52 can be removed, and the platform 46 can be moved, with its winches and motors, to any of the levels of the shed as may be needed for any given operation.

Figure 1:
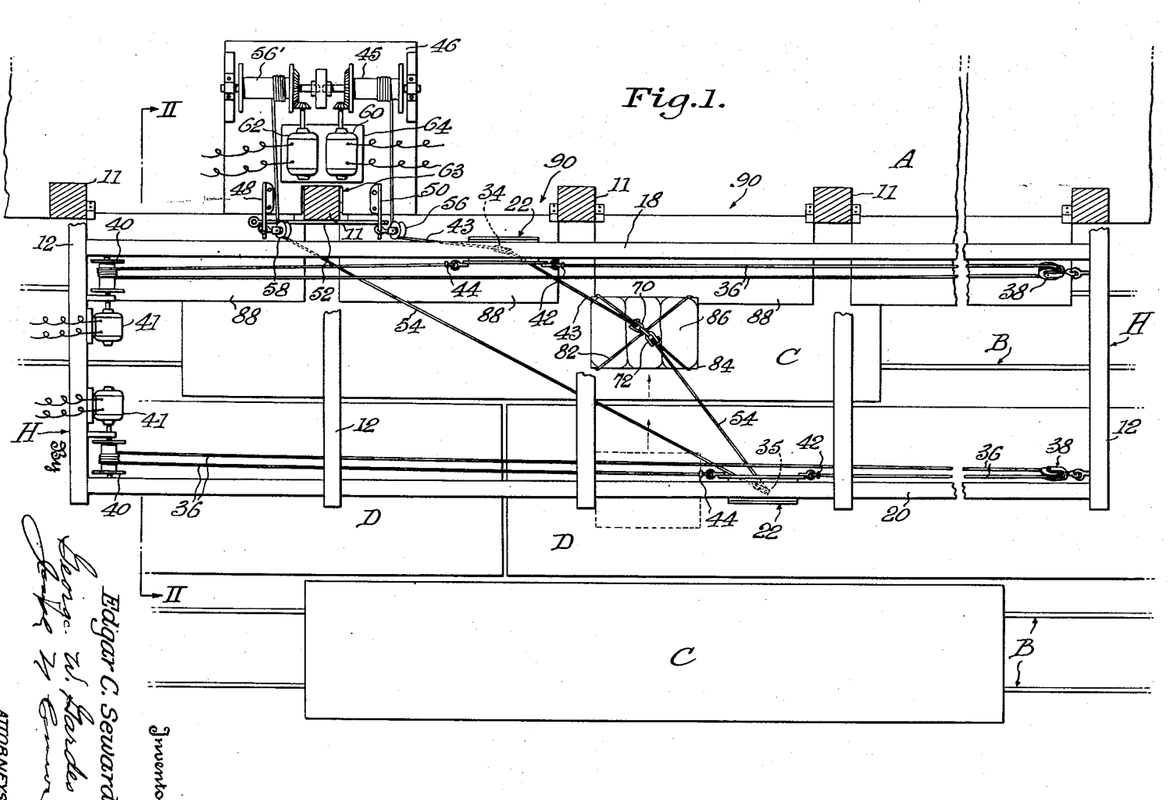
Fig. 1 represents a plan view of a dock or wharf equipped with the construction of the present invention.
Figures 2, 5, 6:
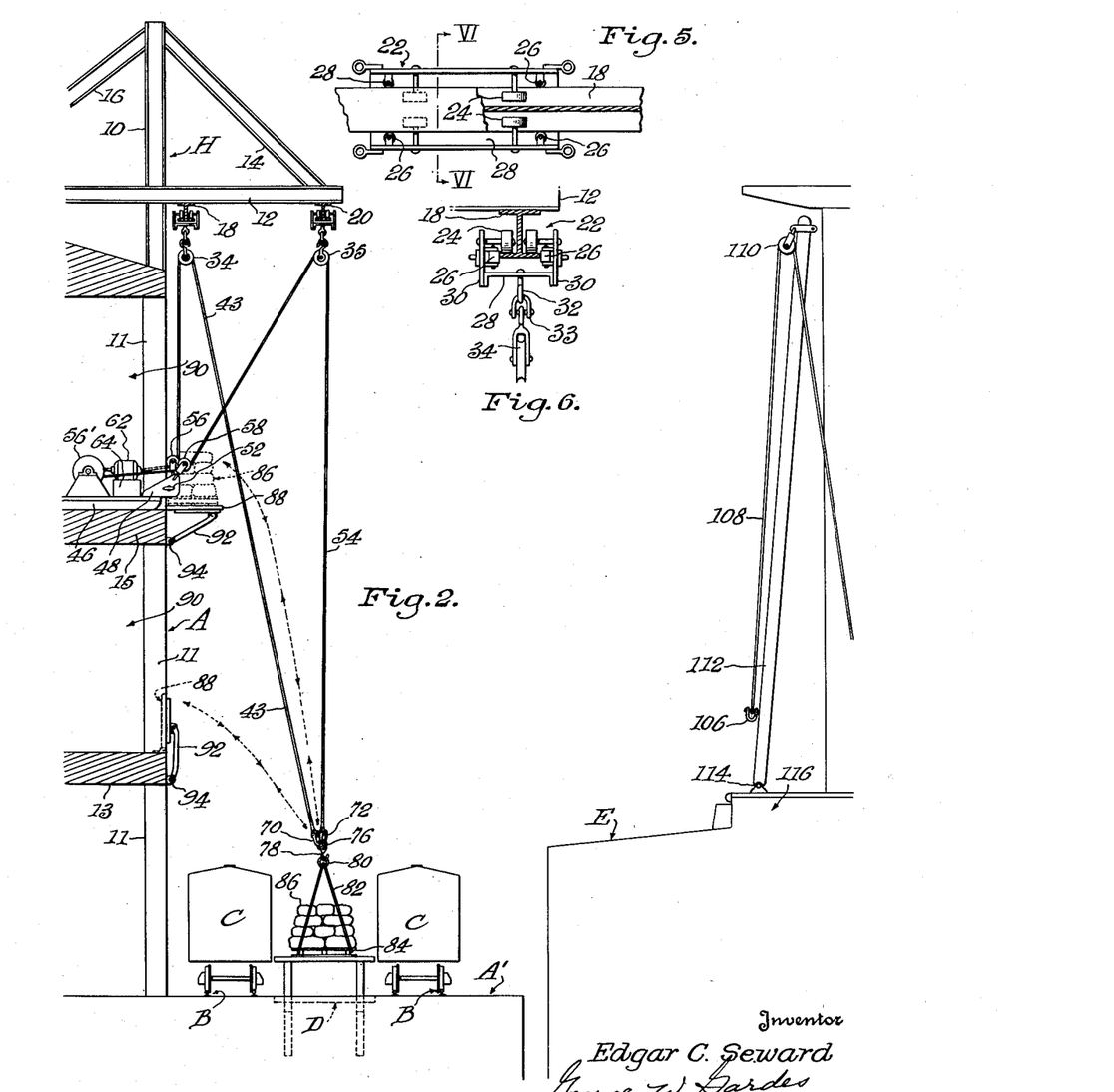
Fig. 2 is a vertical transverse sectional view taken on the line II—II of Fig. 1.
Fig. 5 is a plan view, partially in section, of a fragment of a trolley track employed in the present construction, showing a traveling carriage mounted thereon.
Fig. 6 is a transverse sectional elevation taken on the line VI—VI of Fig. 5, looking in the direction of the arrows.
Figure 13:
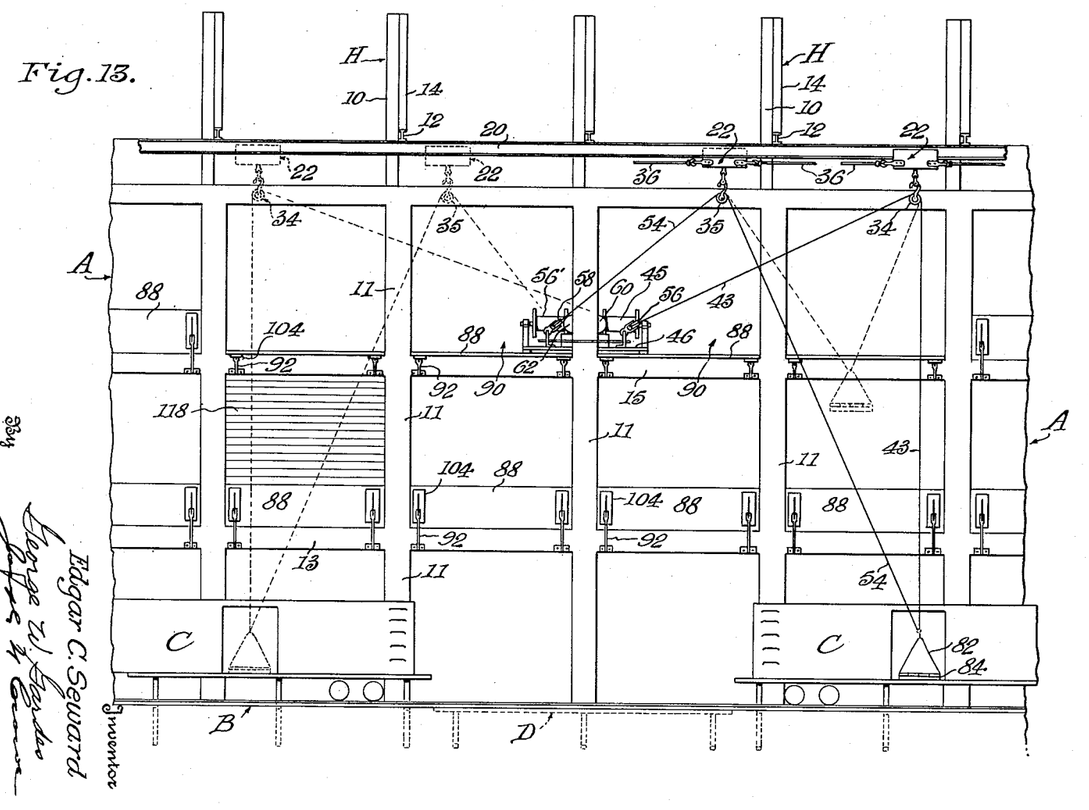
Fig. 13 is a front elevation of the improved equipment.

The operation shown in Fig. 2 shows the end shackles 70 and 72 of the inboard and outboard falls 43 and 54 joined to the ring 76 and the hook 78 inserted into the eye 80 of the cargo sling 82. The cargo 86 is unloaded from either or both cars C simultaneously. By operating the motor 62 and winch 56 so that the outboard fall cable 54 is shortened, the sling 82 is raised vertically until it clears the top of the cars C. The inboard fall motor 60 and its winch 45 can then be operated to take in the inboard fall cable 43, and the operation of the motors and winches can be controlled independently so as to bring the loaded sling 82 onto any desired platform 88 at any selected floor level of the shed. During this hoisting operation, the trolley motors 41 can be operated, if necessary, to move the carriages 22 along the I-beam tracks 18 and 20, so as to move the cable falls 43 and 54 and the sling 82 suspended therefrom in a horizontal direction along the pier shed A for positioning the sling on any selected platform in front of any opening 90 of a given level of the shed A. This arrangement enables the working of any disposition of cars placed on the tracks B either in transverse or end-to-end relation, corresponding to the length of the trolley beams 18 and 20, since obviously the carriages 22 can be moved in such position as to enable the simultaneous working of as many cars as can be accommodated by the length of the hoisting cables 43 and 54. This is indicated by Fig. 13, which indicates the simultaneous working of two cars on the same track and widely spaced apart.

The platforms 88 on which the loaded sling 82 is placed by the above-described arrangement are pivotally mounted, and when in closed position they form a bottom closure for the loading openings 90 of the shed A. To permit the closing and opening of the platforms 88, the supporting arm 92 of the platform is turnably mounted in a bracket 94 mounted as shown on the outside of the pier structure adjacent to the floor lines of the respective levels of the pier. Each platform 88 is rotatably mounted in bearing brackets 98 secured to the floor of the shed by fastening instrumentalities 99, the sides of the platform being provided with trunnions 100 which operate in the bearing brackets 98. The upper end of the arm 92 is pivotally connected to a T-shaped slide member 102 that slides in the slotted track 104 on the underside of the platform 88, this arrangement permitting the platforms to be shifted between closed and open positions.

Figures 3, 7:
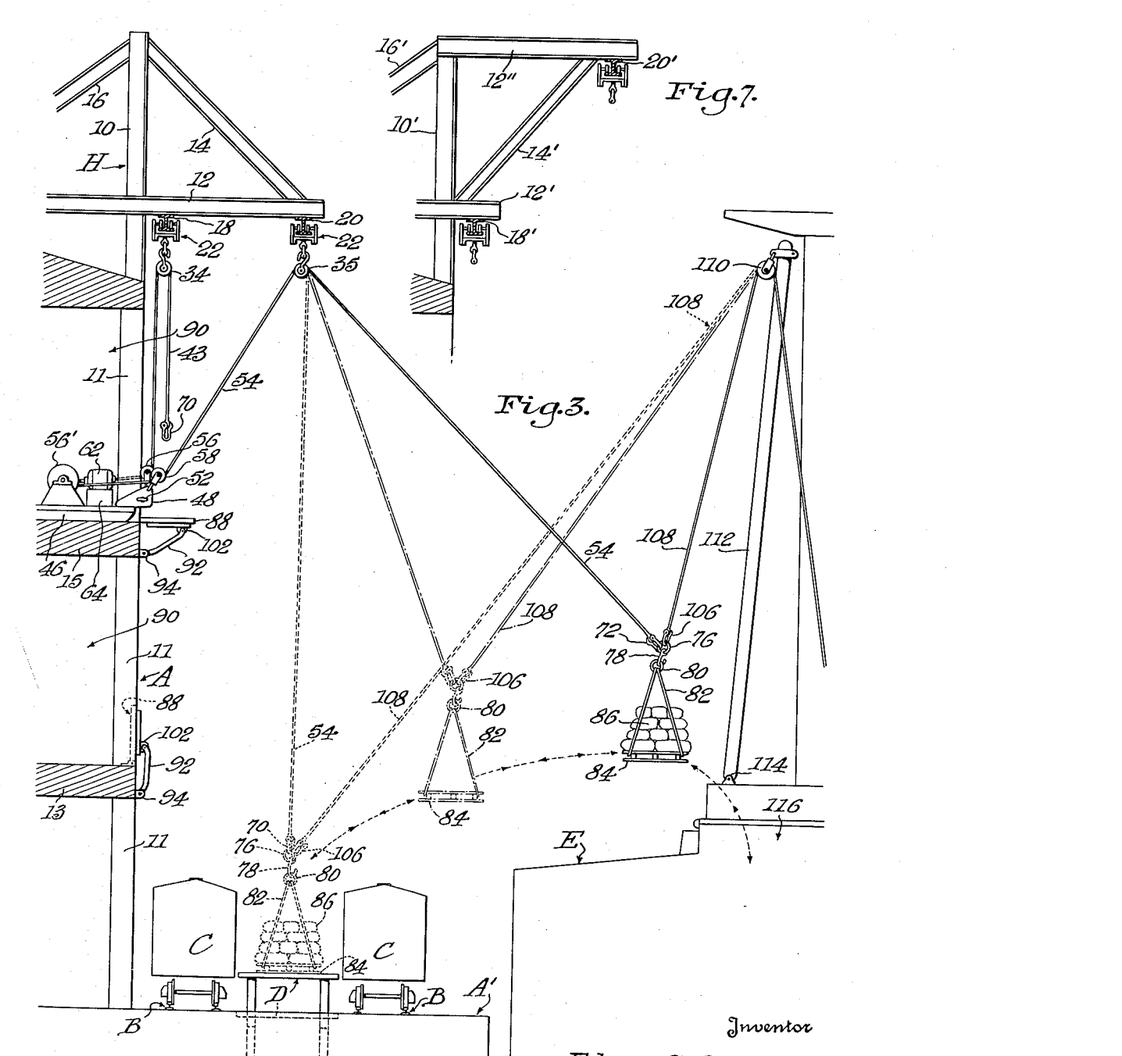
Fig. 3 is a view similar to Fig. 1, but showing cargo handling between cars and ship.
Fig. 7 is a sectional elevation showing a modification of the trolley rails.

Fig. 3 shows the equipment of the present invention applied to working between a ship E and cars C. Again the platform D is shown in elevated position between the cars C, and the shackle 70 of the inboard cable 43 is released from the ring 76 which now is held in shackle 72 of the outboard cable or fall 54. The ring 76 is engaged by a shackle 106 on the free end of the ship's hoist cable or fall 108 which is passed over pulley 110 on the upper end of the ship's boom 112, and secured to an operating winch, not shown, on the ship. The boom 112 is mounted at 114 for universal movement.

By first taking up the outboard cable 54, the sling 82 is lifted from the platform D until it clears the cars C, and then by paying out the cable 54 and pulling in on the ship's cable 108, the sling can be positioned over the ship's hatch 116 and lowered into the hold for loading with cargo. When the sling is loaded, it is pulled out of the hold by taking up on the ship's cable 108, the outboard cable 54 being kept paid out until the loaded sling is hoisted out of the hold and clear of the hatch 116. The ship's cable 108 is then paid out and the outboard cable 54 is taken in until the loaded sling is brought over the top of the cars and over the platform D. By paying out both cables 108 and 54, and positioning the outboard carriage 22 in proper position relatively to the doors of the cars C, the loaded sling can be deposited on the platform D between the doors of the cars, or suitably suspended so as to be brought readily inside of the cars through the doors thereof for easy transfer of the cargo from the sling to the floor of the cars. The dotted lines show the course of travel of the sling and cables during this transfer.

The ship's boom 112 enables the forward holds of the ship to be unloaded by this arrangement without shifting the position of the outboard carriage 22 on the rail 20. A similar arrangement permits the working of the aft holds, with whatever shifting of the outboard carriage may be required.

Figure 4:
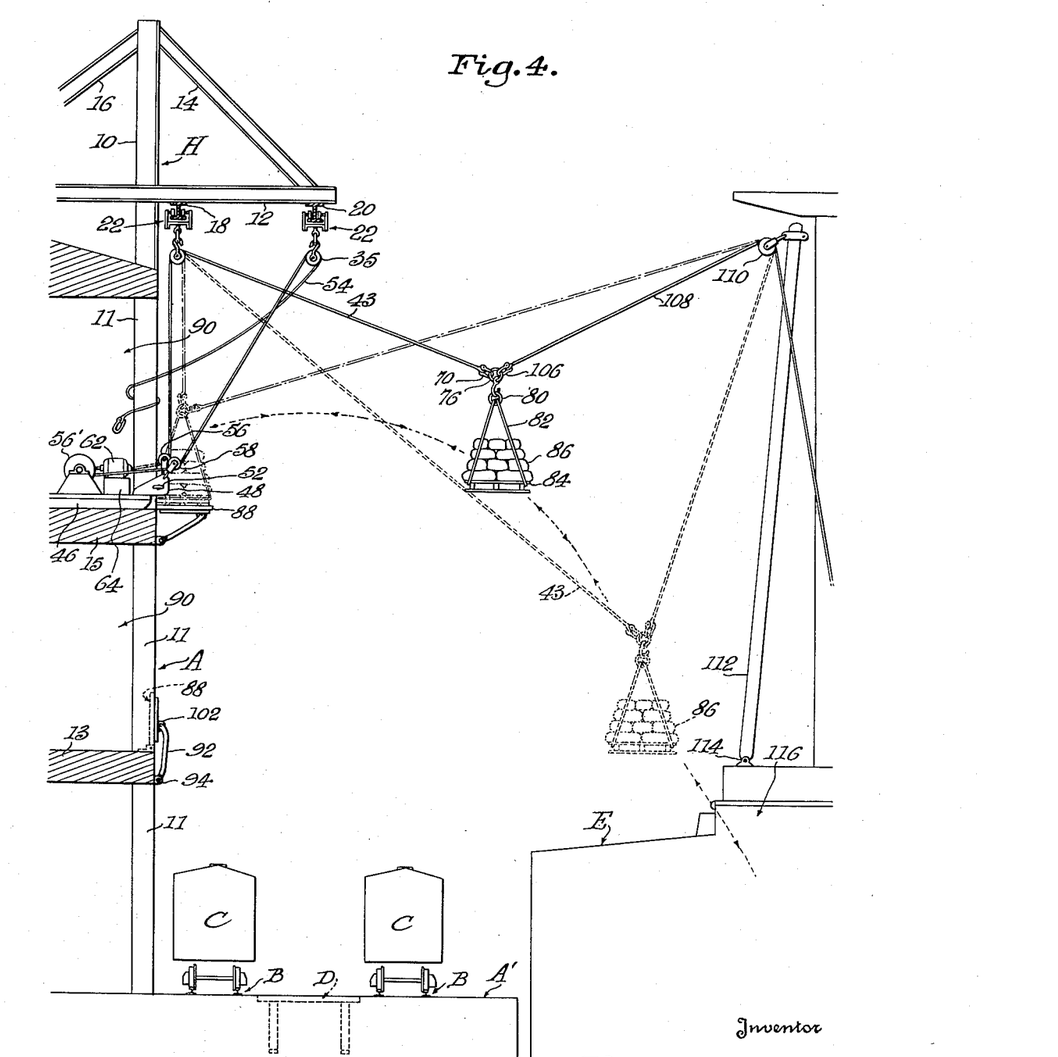
Fig. 4 is a view similar to Fig. 1, but showing cargo handling between a ship and a level of a multiple story pier shed or warehouse.
Figure 8:
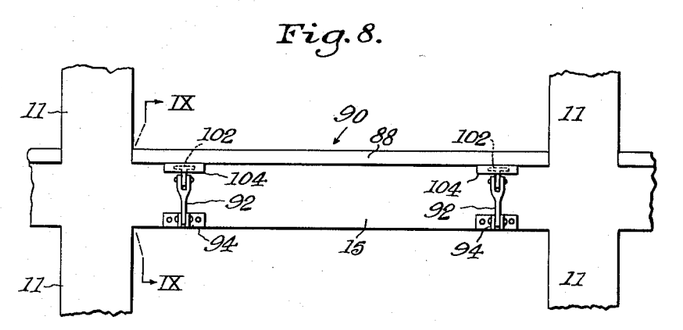
Fig. 8 is a fragmentary front elevation of a loading platform on one of the levels of the pier shed in open position.
Figures 9, 10:
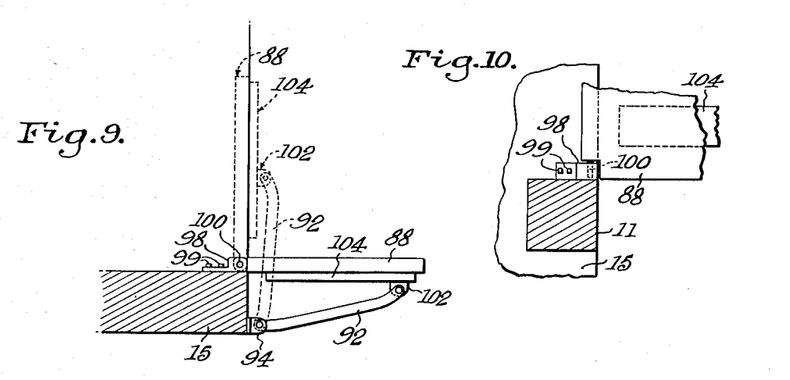
Fig. 9 is a transverse sectional view taken on the line IX—IX of Fig. 8, looking in the direction of the arrows.
Fig. 10 is a detailed plan view showing the pivotal mounting of the loading platform of Fig. 8, the platform being shown fragmentarily and in open position.
Figure 11:
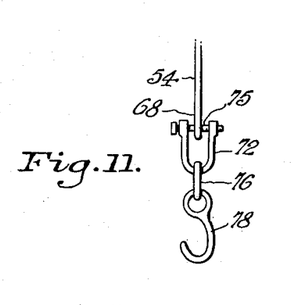
Fig. 11 is a fragmentary view of the free end of the cable falls showing shackle and hook secured thereto.
Figure 12:
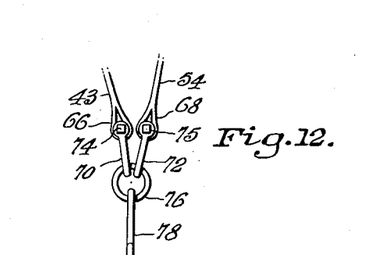
Fig. 12 is a side view of Fig. 11.

Fig. 4 shows the arrangement of the invention applied to working a ship to and from a level of a multiple-level pier or dock. The inboard cable 43 is attached by shackle 70 and ring 76 to sling 82 as described above, and the ship cable 108 also is attached to the sling. By retracting cable 108 and paying out cable 43, the sling can be moved from the platform 88 to the ship's hatch; and conversely, retracting cable 43 and paying out cable 108, after removal of the sling from the hold, will replace the sling on the platform 88; and by moving the inboard carriage along track rail 18, the sling may be brought to any selected platform 88 at any level. It will be understood that each platform 88 is a separate unit for each of the loading openings 90 and, as has been said, when it is in closing position, it forms a closure for the lower part of its opening; the remainder of which opening is closed by any suitable overhead closure member 118.

The dotted lines in each view show the course of travel of the slings and cables under action of the winches 45 and 56, and the flexibility of the installation is limited only by the length of the cables and the length of the space between the end frames H for the trolley beams 18 and 20. The simplicity of the installation and the universality of the movements of the sling are outstanding simplifications of functions heretofore obtainable only by heavy equipment of high complexity and costs both of installation, maintenance, and operation.

The invention is not limited to a dock installation but it may be applied to any location where large amounts of freight are to be handled. Thus, in a railroad freight terminal, the installation of the equipment of the present invention eliminates the need for elevator equipment and substantially eliminates the need for horizontal vehicular travel with attendant vehicle requirements.

The arrangement of the invention eliminates the slowness of elevators in the transit sheds as well as reduces materially the horizontal moving distance by providing additional space and rapid means of lifting cargo direct from car to the desired storage place, which is near ship's-side, by burtoning cargo by means of the two house falls 43, 54 and portable winches 45 and 56, from the liftable platform D on the pier apron A' to the upper levels of the transit shed or warehouse A (Fig. 2).

The working of cargo from or to car and ship direct, as shown in Fig. 3, has many advantages that often are difficult to obtain in the absence of the arrangement of the present invention. The vertically movable loading platform D with the outboard fall spotted in the center of the platform from the outrigger beams 12 for corresponding movement of the trolley 22 permits the working of more than one car simultaneously. The arrangement of the traveling trolleys accomplishes the same results as conventionally are obtained by the use of expensive cranes, without the horizontal swinging arc, since it permits the draft to move in a direct line to landing point in the ship's hatch. With the working-topping lift boom on the ship, practically the same results can be accomplished as are produced by a level luffing crane. Working more than one car at a time direct to or from ship results in less switching and detention and reduces rehandling.

A fixed heavy lift crane (not shown) is provided at the dead space opposite the ship's machinery space. The shifting of the ship forward or aft for heavy lifts results in only slight, if any, delay.

Overhead-type doors are provided for all decks. The decks of the shed A have the lower six-foot part hinged to form the platform 88, thereby forming the loading platform for rigging and unrigging of sheds.

Breakdowns of portable interchangeable deck winches do not present as serious a problem as occurs when cranes break down. The problem of rigging dock winches and marrying falls is not difficult if manila line is reeved through the house fall blocks 56, 58. This can be accomplished by reeving the outboard fall 54 through the house blocks and shackling it as indicated at 72 to the hook 78 and to the other fall 43. Anchoring the dock winch presents no problem as will be apparent from the drawings and provides clear visibility.

In Fig. 7 there is shown fragmentarily a modification which is adapted for use with a shed structure of less height to permit safe burtoning of cars without a straight pull on the cargo lift to reduce the stress, wherein the trolley rails 18' and 20' are mounted at different heights, for which purpose there is provided a lower horizontal beam 12' which projects from its vertically secured beam 10' only sufficiently far to give clearance between the lower inboard trolley rail 18' and the face of the pier shed A, whereas the upper horizontal outrigger beam 12" projects sufficiently far from the vertically disposed beam 10' for the outboard trolley rail 20' to be positioned directly above the horizontal center line of the vertically movable platforms D as described above. The relatively long, upper outrigger beam 12" is braced by a diagonal brace 14' and the vertically disposed beam 10' is supported by the brace beam 16', as shown.

Having thus described my invention, what I claim as new and wish to secure by Letters Patent is:

1. In a freight terminal comprising a building structure adapted to receive and to house freight, the said building structure including a plurality of floor levels having freight-transfer openings along each level, and freight transfer platforms adjacent to the openings, the improvements which include spaced parallel tracks disposed adjacent to the building structure, a freight-handling platform adjacent to the tracks and having a deck substantially level with the floor of a freight car on the tracks, and material-handling equipment mounted on the building structure including parallel overhead trolley rails, a carriage on each rail, one of the carriages being an inboard carriage and another of the carriages being an outboard carriage, a pulley suspended from each carriage, means for independently moving the carriages along the rails, a cable on each pulley, each of the cables having a free end and an attached end, means on the free ends of the cables for attaching thereto a load to be handled and for attaching the free ends of the cables together, selectively, one of the cables being an inboard cable and another of the cables being an outboard cable, the outboard trolley rail being mounted substantially immediately over the center line of the freight-handling platform adjacent to the tracks, and independently operable, power-actuated means for actuating each cable independently and simultaneously, selectively, thereby imparting combined and simultaneous vertical and lateral movements of the load carried by the cables in a single plane, which combined movement in conjunction with movement of either carriage relative to its trolley rail enables placement of the load between the freight car on the tracks and any selected freight-transfer platform on the building structure and also on the freight-handling platform adjacent to the tracks, selectively, without requiring shifting of the location of the freight car on the tracks.

2. In a fast-clearing pier for handling freight cargoes, including a building structure defining a pier, an apron extending from the pier against which a ship may be berthed, the building structure having a plurality of floor levels provided with openings therealong through which freight may be transferred, railroad trackage on the apron for receiving a freight car, a freight-handling platform mounted on the apron adjacent to the trackage, the improvements which include spaced mounting frames on the building structure, each including a horizontally extending outrigger beam, a pair of parallel trolley rails secured to the beams and spanning the space therebetween at an elevation above the highest floor level of the building structure, one of the rails being an inboard rail and another of the rails being an outboard rail, carriage means on each rail, mechanism for independently actuating the carriage means a pulley suspended from the carriage means, a cable on each pulley, there being an inboard cable and an outboard cable, the said cables having a free end and a secured end, means mounted on a selected floor level of the building structure for independently operating the cables, attaching means on the free ends of the cables for enabling connecting together of the cables and attachment of a load to one of the said cables, and, selectively, attaching either cable to a cable from the ship, operation of the cables producing a vertical movement of the load until the cars on the railroad trackage are cleared and then a composite simultaneous vertical and lateral movement in a single plane of the load between a car on the trackage to a desired opening in the building structure and to a selected hatch of the ship, selectively, the outboard trolley rail being positioned substantially directly above the longitudinal center line of the vertically movable platform adjacent to the trackage, any selected manipulation of the load being effected without shifting of the position of the car on the trackage or berth of the ship at the apron.

3. In a fast-clearing pier for handling freight cargoes, which comprises a building structure defining a pier for receiving cargo, an apron extending laterally from the pier against which a ship may be berthed, the building structure having a plurality of floor levels provided with door openings therealong through which cargo is adapted to be handled, parallel railroad tracks on the pier apron, and a freight-handling platform intermediate the tracks, the improvements which include spaced mounting frame members extending above the building structure and mounted thereon, the said frame members including a horizontally disposed outrigger beam, a pair of trolley rails carried by the outrigger beams, one of which beams forms an inboard beam, and the other of which beams forms an outboard beam positioned substantially directly above the center line of the freight-handling platform intermediate the tracks, carriage means on each of the trolley rails, a pulley suspended from each carriage means, a separate cable on each pulley, there being an inboard cable and an outboard cable, each cable having a free end and a fixed end, separate and independently operable mechanism for independently moving the carriage means along each trolley rail, separate and independently-operable mechanism for taking up and paying out each cable, and releasable fastening means on the free end of each cable for selectively fastening each cable to a load of freight to be handled, to such load and to each other, and to such load and to a ship's cable, selectively, whereby freight may be worked selectively from cars on the tracks and any selected station on the building structure, from the cars to a ship berthed at the apron, from the building structure to the ship, and all vice versa, the cable-operating mechanism imparting composite and simultaneous vertical and lateral movements in a single plane of the load carried by the cables for placing the said load in any desired station on the pier and ship, selectively, without changing the position of the cars on the tracks or the ship.

4. In a fast-clearing pier for handling freight cargoes, including a building structure defining a pier for receiving cargo, an apron extending laterally from the pier, against which a ship may be berthed and which has parallel railroad tracks thereon, the building structure having a plurality of floor levels provided with door openings therealong through which cargo is adapted to be handled, the improvements which comprise spaced structural frame members mounted on the building structure and extending thereabove, the said frame members including a horizontally disposed outrigger beam, a pair of parallel trolley rails carried by the outrigger beams, one of which beams forms an inboard beam and the other of which forms an outboard beam positioned substantially directly above the center line of the freight-handling platform intermediate the tracks, carriage means on each of the trolley rails, a pulley suspended from each carriage means, a separate cable on each pulley, there being an inboard cable and an outboard cable, each cable having a free end and a fixed end, separately and independently operable mechanism for independently moving the carriage means along each trolley rail, separate and independently operable mechanism for taking up and paying out each cable, portable mounting means for the said mechanism whereby the mechanism may be transported from one operating station to another at any level and location of the building structure, means releasably locking the mechanism to the building structure, and releasable fastening means on the free end of each cable for selectively fastening the cables to a load of freight to be handled, and either of the cables to such load and to a ship's cable, and vice versa, the cable-operating mechanism imparting composite and simultaneous vertical and lateral movements in a single plane of the load carried by the cables for placing the said load in any desired station on the pier and ship, selectively, and without moving the ship relative to the pier.

5. Freight-handling equipment comprising a pair of spaced, parallel, overhead trolley rails, carriage means movably mounted on each rail, mechanism for separately and independently operating the carriage means for moving each of the said means along the rails to a selected station, a hoisting cable suspended from each of the carriage means, separate and independently operable mechanism for actuating each hoisting cable independently of the other, the said cable-actuating mechanism being disposed below the said trolley rails but laterally thereof, and means on the said cables for connecting them to a load to be handled, the said cables and load being adapted to be moved longitudinally along the rails and to be lifted and lowered, selectively, in a composite and simultaneous vertical and lateral direction responsively to actuation of the carriage-actuating means.

6. Freight-handling equipment comprising a freight-receiving building structure, a pair of spaced, parallel trolley rails extending longitudinally along and parallel with the building structure and elevated above a top floor level thereof, carriage means movably mounted on each rail, mechanism for separately and independently operating the carriage means for moving each of the said means along the rails to a selected station, separate hoisting cables suspended from each of the carriage means, separate and independently operable mechanism portably mounted on a floor level of the building structure for actuating each hoisting cable independently of the other, and means on said cables for releasably attaching the cables to a load, the carriage means and cable-operating mechanism being disposed relative to the load for imparting first a vertical movement of the load during hoisting thereof, and then a combined and simultaneous vertical and lateral movement in a single plane to the load as the cables are shortened by the operating mechanism for positioning the load at any selected station in the building structure.

7. In freight-handling equipment comprising a freight-receiving building structure, the improvements which comprise a pair of spaced, parallel trolley rails extending longitudinally along and parallel with the building structure and elevated above a top floor level thereof, the said rails being vertically offset from the building structure for clearance thereof, carriage means movably mounted on each rail, mechanism for separately and independently operating the carriage means for moving each of the said means along the said rails to a selected station, the operating mechanism including a power-actuated winch for each of the carriage means and an endless cable operated by each winch and attached to each of the carriage means, separate hoisting cables suspended from each of the carriage means, separately and independently operable mechanisms mounted on a floor level of the building structure for actuating each cable independently of the other, the said cable-operated mechanism including a power-actuated winch for each cable, upon which each cable is wound, a portable platform carrying the winches and enabling the winches to be positioned at varying selected stations on the building structure, means for releasably securing the platform to the building structure, and means on the said cables for releasably attaching the cables to a load, the carriage means and cable-operating mechanism being disposed relative to the load for imparting a vertical movement to the load at an end of travel of the load and a combined and simultaneous vertical and lateral movement to the load during remainder of travel of the load.

EDGAR C. SEWARD.

REFERENCES CITED

The following references are of record in the file of this patent:

UNITED STATES PATENTS

| Number | Name | Date |
|---|---|---|
| 1,261,504 | Fitch | Apr. 2, 1918 |
| 1,520,150 | Skougor | Dec. 23, 1924 |
| 1,521,266 | Andrews | Dec. 30, 1924 |

FOREIGN PATENTS

| Number | Country | Date |
|---|---|---|
| 792,993 | France | Nov. 7, 1935 |

OTHER REFERENCES

Cargo Handling at Ports, pages 46, 47, by Brysson Cunningham (1924).

Engineering News Record, page 111, May 16, 1918.